Patented Jan. 18, 1938

2,105,850

UNITED STATES PATENT OFFICE 2,105,850

PROCESS FOR THE REFORMING OF GASOLINE DISTILLATE

Adrianus Johannes van Peski, Amsterdam, Netherlands, assignor to Shell Development Company, San Francisco, Calif., a corporation of Delaware No Drawing. Application June 22, 1936, Serial No. 86,584. In the Netherlands July 10, 1935

11 Claims. (Cl. 196—52)

This invention relates to the reforming of gasoline distillates in the presence of reforming catalysts activated with hydrogen halides or alkyl halides for the purpose of raising the antiknock ratings of such distillates.

It is known to crack and/or polymerize hydrocarbons with activated catalysts. Cracking and polymerizing processes are, however, distinctly different from reforming processes. In cracking the desired reaction is one of carbon-carbon scission, while in polymerization the joinder of two or more similar molecules is governing. The effect of these reactions is to produce hydrocarbon mixtures of boiling ranges substantially different from those of the starting materials. In the reforming of gasolines, however, products are desired which have substantially the same boiling ranges as those of the starting materials, the principal difference between the raw and the reforming products being in their relative antiknock values. Re-arrangements of molecules are the main reactions involved in reforming, particularly in the case of aliphatic hydrocarbons, which re-arrangements may be accomplished by varying degrees of dehydrogenation.

Reforming is being practiced with or without catalysts. Catalytic reforming usually has the advantage over non-catalytic reforming in that it can be carried out at lower temperatures than the latter, with the result that for a given octane number improvement, less gas is produced in the catalytic process.

My invention is concerned with the application of a combination of catalysts to the known process of reforming. I have found that under otherwise identical conditions, a greater improvement in octane number and a lower gas loss can be obtained with my catalysts than has been possible with other catalysts heretofore proposed.

My catalyst consists of a combination of at least two individual compounds, one of which may be considered the catalyst proper, and the other which I call for the purpose of this disclosure, the activator. The literature on catalytic reforming reveals that a great many substances act as catalysts for this purpose. For instance, in U. S. Patent 1,913,940 a large list of suitable substances is disclosed, including metals, their oxides and sulfides, activated carbon, silicates, etc. Other known catalysts capable of reforming gasolines are the Friedel-Crafts catalysts comprising anhydrous metal halides which upon addition of water liberate hydrogen halide, for example, aluminum chloride, iron chloride, chromium chloride, bismuth chloride, tin chloride, etc.; or the phosphates of the alkali, alkali earth and earth metals; or coke activated by phosphoric acid, etc.

The group of compounds which I term activators consists of hydrogen halides and compounds capable of liberating hydrogen halide under the conditions of the treatment. Examples of such compounds are the primary, secondary, and tertiary alkyl halides of more than one carbon atom, such as ethylene chloride, isopropyl chloride, tertiary butyl chloride, amyl chlorides, methyl bromide, ethyl fluoride, halogenated gasoline. Particularly useful are the tertiary alkyl halides because they liberate hydrogen halide with comparative ease especially when in contact with certain of the reforming catalysts, and yet for most practical purposes they are non-corrosive.

Reforming in the presence of my catalysts proceeds satisfactorily over a temperature range from 225° C. to 500° C. Inasmuch as gas losses diminish with a lowering of the treating temperature, I normally prefer to treat at temperatures below about 350° C., at which temperature substantially no fixed gas is formed, even upon exposure of the gasoline to the catalysts for several hours. Since gas formation is due to cracking, operating in a temperature range below cracking temperatures substantially avoids gas formation. The economical importance of this result is obvious. To avoid substantial polymerization of olefines which may be contained in the treating gasoline, the temperature is preferably kept above about 225° C. since, as a general rule, it is not desired to change the boiling range of the gasoline upon reforming. Thus it is possible to recover at least 75% of a reformed product from a gasoline containing relatively large amounts of olefines, such as are produced in conventional liquid phase cracking, the reformed product having about the same boiling range as the original product.

The necessary time of contact which depends on the temperature and activity of the catalyst may vary over a wide range, and must be determined experimentally for various catalysts and temperature combinations. It is not possible to specify the time except by way of example, as hereinafter set forth. The only general rule with regard to time limitation is so to limit the time to avoid a substantial change in the distillation range of the gasoline and when operating in the temperature range in which cracking occurs to avoid substantial production of gas.

My process may be carried out in various modifications. For instance, the activator may be dissolved in a gasoline and the resulting mixture may be conducted either at substantially atmospheric pressure in the vapor phase or under sufficient superatmospheric pressure to maintain it in the liquid state, over or through the catalyst which, if solid, may be arranged in the form of a filter-like bed; or the catalyst, if liquid or solid, may be suspended in a finely divided state in the liquid gasoline by agitation; or the finely divided catalyst may be carried by a stream of gasoline vapors through a heating chamber. In general, I prefer to operate under sufficient pressure to maintain the gasoline distillate in the liquid phase, the improvement in octane number being greater than that which can be obtained in vapor phase treatment under otherwise similar conditions.

The amount of activator which is introduced into the gasoline before or during the contact with the catalyst, necessary to produce the desired activation, is determined on the basis of available hydrogen halide, the quantity of hydrogen halide being always below 2% by weight of the gasoline distillate and normally of the order of .1% to .4%, although quantities of less than .1% of available hydrogen halide have frequently given results which are markedly improved over those obtainable in the absence of activators.

All gasoline distillates having relatively low knock ratings, i. e., below about 70 octane number (A. S. T. M. method D357-34T) benefit by my treatment. Normally the lower the octane number, the greater the improvement. As to distillates of about equal knock ratings, those containing olefines, i. e., cracked gasoline distillates, are somewhat more responsive to my treatment than substantially saturated straight run gasolines. In this latter respect my treatment differs from most other catalytic or non-catalytic reforming treatments, in which straight run gasolines are normally improved to a greater extent than cracked gasolines. Although I do not wish to be bound by any theories, I believe that the hydrogen halide activator attaches itself temporarily to the olefines, thereby saturating them. The saturated resulting chlorinated hydrocarbon in contact with the catalyst is then isomerized and subsequently the hydrogen halide is reliberated. This reliberation makes the hydrogen halide available to activate other portions of the gasoline, which may be responsible for the fact that such relatively small quantities of activators will effect such decided improvements.

When reforming cracked gasolines of high olefine and particularly high di-olefine content, a certain amount of polymerization may take place. In this case, I usually subject the treated gasoline to a redistillation, to separate gasoline from polymers boiling above gasoline range.

Following are examples which serve to illustrate my process:

Example I

A narrow boiling octylene fraction of 45 octane number obtained by vapor phase cracking of paraffin wax and fractionally distilling the cracked product, was mixed with 1% by volume of tertiary butyl chloride. The mixture was heated for two hours at 325° C. at a pressure of 50 atmospheres which was sufficient to keep it in the liquid state, in a closed container in contact with anhydrous ferric chloride. At the end of this period the mixture was cooled, the pressure was released and the reformed distillate was redistilled. About 85% of a narrow boiling fraction was obtained which had an octane number of 63. When treating the same octylene fraction under otherwise identical conditions but in the absence of tertiary butyl chloride, the octane number of the treated fraction was 55.

No gas loss occurred in either treatment.

Example II

The octylene fraction of Example I was mixed with 1% by volume of tertiary butyl chloride and the resulting mixture was heated in the liquid state for 4 hours at 275° C. under a pressure of 30° atmospheres in contact with aluminum oxide. After redistilling the treated fraction, it had an octane number of 56, while a fraction treated identically but in the absence of activator, had an octane number of 46.

Example III

The octylene fraction of Example I, while in the liquid state, was mechanically agitated with magnesium pyrophosphate for 4 hours at 275° C., at a pressure of 30 atmospheres. In the presence of tertiary butyl chloride the octane number increased from 44 to 54, and in the absence of the chloride it increased to 47 only.

Example IV

A cracked gasoline having a boiling range of 60–170° C. and an octane number of 55 was heated in the liquid state for 2 hours at 325° C. under a pressure of 70 atmospheres in contact with anhydrous ferric chloride and in the presence of 1%, by volume, of ethylene chloride. After redistillating the treated product to the original distillation range, 80% of a gasoline having an octane number of 69 was obtained.

I claim as my invention.

1. In the process of reforming gasoline distillates to improve their antiknock rating, the steps comprising contacting a gasoline distillate of low antiknock rating at a reforming temperature between 225° and 500° C. with a reforming catalyst in the presence of a small quantity of a tertiary alkyl halide for a time sufficient to effect reforming without forming a substantial amount of gas.

2. The process of claim 1, in which the gasoline distillate contains olefines.

3. The process of claim 1, in which the gasoline distillate has an octane number below about 70.

4. The process of claim 1, in which the gasoline distillate is under sufficient pressure to keep it in the liquid state.

5. The process of claim 1, in which the reforming temperature is below cracking temperature.

6. The process of claim 1, in which the reforming temperature is between 225° C. and 350° C.

7. The process of claim 1 in which the amount of tertiary alkyl halide is less than .4% of the gasoline distillate reformed.

8. The process of claim 1 in which the alkyl halide is tertiary butyl chloride.

9. In the process of reforming gasoline distillates to improve their anti-knock rating, the steps comprising contacting a gasoline distillate of low anti-knock rating at a reforming temperature between 225° and 500° C. with a Friedel-Crafts catalyst in the presence of a small catalytic quantity of a tertiary alkyl halide for a time sufficient to effect the reforming without forming a substantial amount of gas.

10. In the process of reforming gasoline distillates to improve their anti-knock rating, the steps comprising contacting a gasoline distillate of low anti-knock rating at a reforming temperature between 225° and 500° C. with a phosphate of a metal selected from the group consisting of alkali and alkali earth metals in the presence of a small catalytic quantity of tertiary alkyl halide for a time sufficient to effect the reforming without forming a substantial amount of gas.

11. In the process of reforming gasoline distillates to improve their anti-knock rating, the steps comprising contacting a gasoline distillate of low anti-knock rating at a reforming temperature between 225° and 500° C. with a phosphoric acid deposited on coke in the presence of a small catalytic quantity of tertiary alkyl halide for a time sufficient to effect the reforming without forming a substantial amount of gas.

ADRIANUS JOHANNES VAN PESKI.